United States Patent Office 3,725,084
Patented Apr. 3, 1973

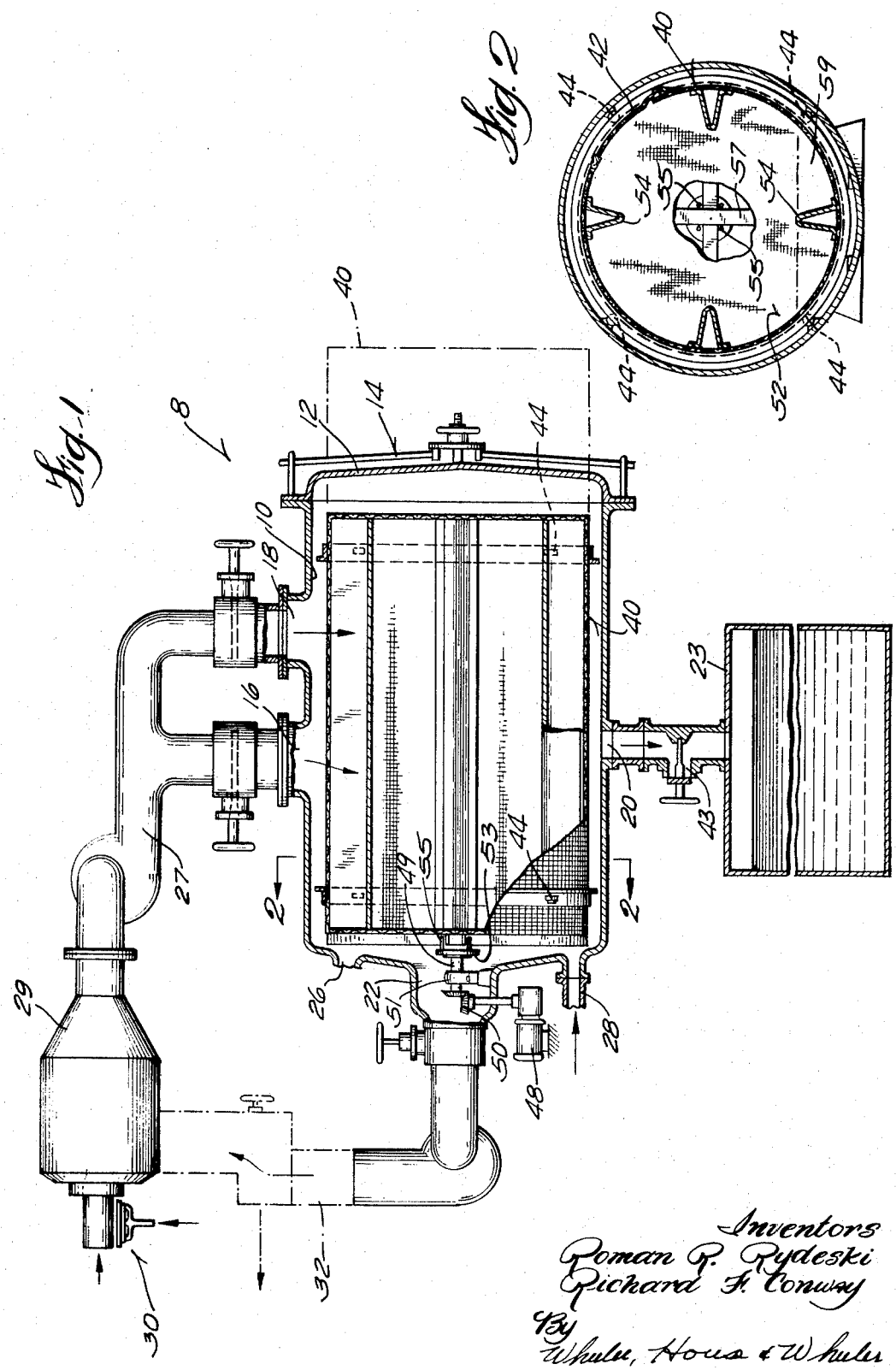

3,725,084
METHOD OF PREPARING PUFFABLE FOOD PELLETS FROM PORK SKINS
Roman R. Rydeski, 1505 Manistique Ave., South Milwaukee, Wis. 53172, and Richard F. Conway, 1503 NW. 7th St., Austin, Minn. 55912
Filed Dec. 28, 1970, Ser. No. 101,874
Int. Cl. A22c *18/00*
U.S. Cl. 99—107                                6 Claims

ABSTRACT OF THE DISCLOSURE

Disclosed herein is a method and apparatus for preparing puffable food pellets from food materials such as green pork skins. Discrete units of the raw food material are subjected to steam at temperatures and pressures sufficient to uniformly introduce and distribute water molecules throughout the food. This step is followed by the steps of rinsing the food portions to remove the melted fat and drying the portions with heated air to encase the added moisture and form crisp pellets which can be substantially expanded in volume or puffed by rapid high temperature cooking.

BACKGROUND OF INVENTION

Certain proteins and carbohydrates can be expanded or puffed to many times their original volume by rapidly vaporizing the water contained in the interstitial spaces of the molecular structure. Protein and carbohydrate molecules having a helical or spring like molecular structure are particularly adapted for rapid expansion. The expansion is caused by the sudden release of pressure caused by vaporization of moisture which stretches the protein or carbohydrate. Various edible food products such as puffed pork rinds have been prepared by cooking the green or raw skins in a heated vessel in the water and fat contained in the skins. The water and fat are then separated from the skins and the skins are then puffed by cooking or French frying in fat at high temperatures. Since the moisture in the skins is not uniformly distributed throughout the skins, the cooked skins do not puff or expand uniformly, and thus some portions are tough, heavy and leathery and are not as readily chewable or palatable as other portions.

SUMMARY OF INVENTION

The invention provides a method for preparing puffable food pellets which are low in fats and which have a uniform moisture content throughout the pellet to afford increased volume by expansion during a subsequent puffing process which forms no part of this invention. The method contemplates introducing and uniformly distributing the moisture in the pellets by forcing the moisture into the spaces in the molecular structure of the protein or carbohydrate during a cooking cycle using steam under predetermined temperature and pressure conditions. After the food product is subjected to steam in the cooking cycle, the food product is rinsed to remove the melted fats. The food product is then subjected to a drying cycle using a flow of heated air circulated by a blower around the pellets. The drying step entraps the moisture by the formation of a crust or shell around each microscopic deposit of moisture. The drying cycle removes surface moisture but not the moisture contained and distributed throughout the pellet.

The uniform interspersion of moisture in pork skins using the method of the invention increases the expansion ratio upon puffing to a 20:1 to a 25:1 ratio, whereas, the expansion ratio of pork skins prepared with the prior method may be 6:1 or 7:1. Moreover, the uniform distribution of moisture causes uniform puffing so that the ultimate food product is uniformly crisp without any undesirable or unedible portions.

Further objects and advantages of the present invention will become apparent from the following disclosure.

FIG. 1 is an elevational view in fragmentary section of apparatus for practicing the method of the invention.

FIG. 2 is a sectional view along line 2—2 of FIG. 1.

The drawings disclose a horizontal cylindrical pressure chamber 8, having a pressure chamber interior 10. The chamber 8 has a door 12 provided with a lock 14 for securing the door in place. The pressure chamber 8 is provided with hot air inlets 16 and 18, a water and steam drain or outlet 20 and a hot air exhaust outlet 22. The drain 20 is connected to a resevoir 23. Water and steam are introduced into the interior 10 of chamber 8 through inlet ports 26 and 28 which are connected to a suitable source of steam and water (not shown).

During the drying cycle, which is hereinafter described in detail, hot air is introduced into the hot air inlets 16 and 18 through a conduit 27 which is connected to a blower 29 which draws air over a gas burner 30. The hot air outlet 22 can be connected to a conduit 32 for recirculation of the hot air to the blower 29.

The food product which is to be processed according to the method of the invention is introduced into a foraminous or mesh cylindrical basket or tumbler 40 by opening a door 42 on the tumbler 40, when the tumbler 40 is axially withdrawn from the chamber 10. The tumbler 40 is supported on rollers 44 at the bottom of the chamber 10 and can be rotated by a motor 48 which is geared to a shaft 49 by gears 50. The shaft 49 is supported in the outlet 22 by a bearing 51. A driving member 53 has axial pins 55 which engage cross brackets 57 on the tumbler 40. The interior 52 of the tumbler 40 is provided with four baffles 54 which project toward the interior or center of the tumbler. The tumblers raise the food portions or diced skins from the bottom of the tumbler and drop the skins into the hot water bath 59 at the bottom of the chamber 10 during the cooking cycle. Skins adhering together are separated when they strike the water.

In accordance with the method of the invention, the food product to be treated is desirably cut into discrete portions or strips and introduced into the tumbler or basket for the cooking step or cycle. If green pork skins or defleshed pork skins are to be prepared in accordance with the method, they are desirably cut into discrete portions or squares about ¾ inch by ¾ inch and introduced into the tumbler 40 for the cooking step or cycle. The tumbler 40 is then moved into the pressure chamber 18 and the door 12 closed. Steam and water are introduced in the water and steam inlets 26 and 28 and the pressure in the chamber 10 is built up to 15 pounds per square inch gauge pressure or approximately two atmospheres. The temperature of the steam introduced is approximately 250° F. or 121° C. The tumbler 40 is rotated for approximately 20 minutes.

The baffles drop the diced skins into a water bath at the bottom of the pressure chamber as the tumbler rotates to separate the skins and coat the surface of the skins with water. At this temperature and pressure, the natural moisture in the pellets will not boil off because the diced skins will not attain the temperature of 250° F. within the 20 minute cooking period, although the boiling point of water at this pressure is around 250° F. Although pressures higher than 15 pounds per square inch gauge pressure could be employed with a corresponding increase in temperature of the steam as long as the boiling point of the natural moisture in the skins is not attained during the cooking period, a gauge pressure of 15 p.s.i. is a pressure which can be contained without expensive pressure-chamber construction.

When pork skins are being processed according to the method, the cooking step should be continued for a time sufficient to increase the moisture content to 55 to 65 percent by weight and reduce the fat content to 6 percent by weight.

Following the cooking cycle, the pressure is released and water and steam are drained out of the chamber 10 by opening the valve 43 thus removing melted fats. A flushing or rinsing cycle is then performed to remove fats from the surface of the skins. Water at a temperature of 200° F. can be employed. Alternatively, the cooked particles can be rinsed in the water bath 59 as the chamber 10 is drained. The water in the chamber 10 will boil when the pressure is released by opening valve 43 causing steam to be generated to aid in the rinsing step. A drying cycle is then commenced in which air heated by burner 30 is blown into the chamber 10 by the blower 29. The hot air enters the chamber 10 through the inlets 16 and 18. The drying cycle continues for approximately the same time as the cooking cycle, or 20 minutes. The temperature of the heated air is approximately 250° F. The temperature of the pellets does not reach 212° F. in 20 minutes, and thus, the moisture introduced into the pellets during the cooking step is not vaporized. The drying cycle provides a crust on the pellets which encases and entraps the moisture which is uniformly distributed throughout the pellets during the cooking cycle. If the temperature of the hot air during the drying cycle is substantially higher than 250° F., the moisture within the pellets can vaporize and the surface of the pellets will be disrupted by the escaping vapor. Furthermore, if the temperature is too high during the cooking or drying cycle, actual melting or thermo-degradation of the food product can occur.

What is claimed is:

1. A method of preparing puffable food pellets from pork skins comprising the steps of cooking discrete units of the food in steam and water at a temperature and pressure and for a time period sufficient to distribute cooking water throughout the food units and said temperature, pressure and time period for the cooking step being such that the natural moisture in the food units attains a temperature less than the boiling point during the cooking step and sufficient to increase the moisture content of the pork skins to 55 to 65 percent by weight and reduce the fat content to 6 percent by weight, tumbling the units during the cooking step to separate the unis and expose surfaces of the units to said steam and water, releasing the pressure and draining the cooking water and melted fats, rinsing the units in water and draining the water to remove remaining melted fats and the final step of drying the discrete units to form crisp pellets by circulating heated air around the units, the air being heated at a temperature sufficient to form a crust to encase the added moisture in the pellets.

2. A method according to claim 1 wherein the step of cooking the food units is performed using steam at a temperature of approximately 250° F. and a pressure of generally two atmospheres and the cooking period is approximately 20 minutes.

3. A method according to claim 1 wherein the units are cooked in a rotating vessel and the cooking step includes periodically dipping the units in a water bath at the bottom of the vessel.

4. A method according to claim 1 wherein the step of drying the discrete units of food is performed with air at a temperature of generally 250° F. and the drying period is generally 20 minutes.

5. A method in accordance with claim 1 wherein the step of cooking the food is performed with steam at a pressure greater than the vapor pressure of the natural moisture in the food at the cooking temperature.

6. A method of preparing puffable food pellets from pork skins comprising the steps of cooking discrete units of the food in steam and water at a temperature and pressure and for a time period sufficient to distribute moisture throughout the food units and said temperature of said steam being generally 250° F., the pressure being generally two atmospheres and time period for the cooking step being generally 20 minutes such that the natural moisture in the food units attains a temperature less than the boiling point during the cooking step, tumbling the units during the cooking step to separate the units and expose surfaces of the units to steam and water, draining the steam, water and fats, removing the remaining melted fats by rinsing the units in water having a temperature of generally 200° F. and draining the water, and the final step of drying the discrete units to form crisp pellets by circulating heated air around the units, the air being heated at a temperature sufficient to form a crust to encase the added moisture in the pellets.

References Cited

UNITED STATES PATENTS 2,947,635   8/1960   Paynter et al. _____ 99—107

HYMAN LORD, Primary Examiner